(No Model.)

T. N. SUBERS.
JOURNAL FOR VEHICLES.

No. 412,995. Patented Oct. 15, 1889.

Witnesses:
Hamilton D. Turner
Alex. Barkoff

Inventor:
Thomas N. Subers
by his Attorneys
Howson & Howson

UNITED STATES PATENT OFFICE.

THOMAS N. SUBERS, OF PHILADELPHIA, PENNSYLVANIA, ASSIGNOR OF THREE-FOURTHS TO SAMUEL B. COUGHLIN, OF BURLINGTON, NEW JERSEY.

JOURNAL FOR VEHICLES.

SPECIFICATION forming part of Letters Patent No. 412,995, dated October 15, 1889.

Application filed February 15, 1889. Serial No. 300,016. (No model.)

*To all whom it may concern:*

Be it known that I, THOMAS N. SUBERS, a citizen of the United States, and a resident of Philadelphia, Pennsylvania, have invented certain Improvements in Anti-Friction Journals for Vehicles, of which the following is a specification.

The object of my invention is to provide simple means for reducing the friction between the journal and journal-box of a vehicle; and this object I attain in the manner hereinafter set forth, reference being had to the accompanying drawings, in which—

Figure 1:
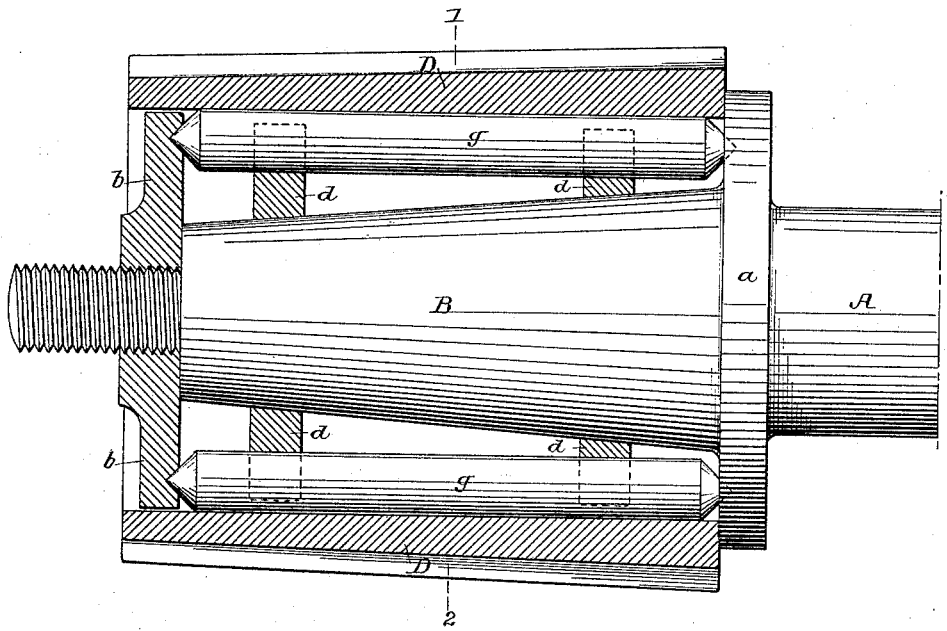
Figure 2:
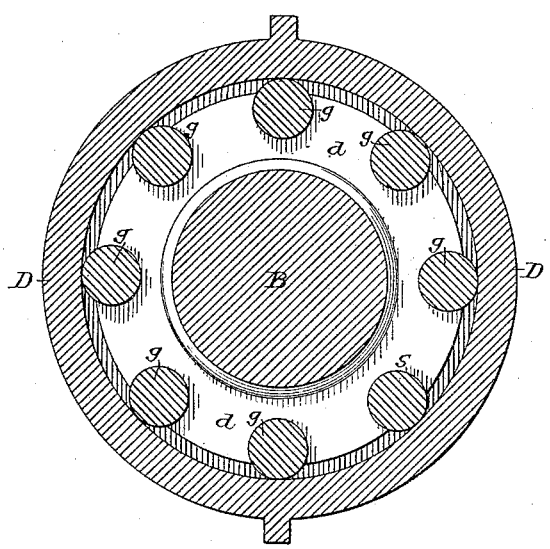

Figure 1 is a longitudinal section, partly in elevation, of a vehicle-journal constructed in accordance with my invention; and Fig. 2 is a transverse section on the line 1 2, Fig. 1.

A represents the axle, which has a journal B, and has at the inner end of said journal a fixed flange or collar $a$, and at the outer end of the journal a detachable collar $b$. Mounted upon and secured to the journal are a series of rings $d$, two in the present instance, these rings having in their peripheries a series of segmental recesses for the reception of hardened rollers $g$, the segmental openings being preferably of greater extent than a half-circle, as shown in Fig. 2, so that while the rollers are confined radially in respect to the journal they are free to turn in the bearings afforded by said segmental openings. These rollers serve as bearings for the journal-box D, and thus very materially reduce the friction of the bearing as compared with one in which the box runs directly upon the journal.

My improved bearing is distinct from those in which the bearing is formed by rollers interposed directly between the journal and the box, as such bearings are not applicable to axles having tapering journals, whereas my improved bearing is applicable to a tapering journal as well as to a straight journal, the tapering journal having been selected as a means of illustrating the invention.

The rollers G are retained in position longitudinally by the inner and outer flanges or collars $a$ and $b$, the inner faces of these being preferably recessed for the reception of the conical ends of the rollers, as shown in Fig. 1.

Having thus described my invention, I claim and desire to secure by Letters Patent—

1. The combination of the axle and its journal, the series of rings or collars mounted on said journal, and a series of rollers adapted to bearings in said rings or collars and forming the bearings for the journal-box of the wheel, but free from contact with the journal, substantially as specified.

2. The combination of the axle and its journal, the rings or collars mounted upon said journal, the rollers adapted to bearings in said rings or collars and serving as bearings for the journal-box of the wheel, and flanges or collars serving as bearings for the ends of said rollers and confining them in position longitudinally, substantially as specified.

3. The combination of the axle and its journal, the rings or collars mounted thereon and having in their outer peripheries segmental recesses each of greater extent than a half-circle, and rollers having their bearings in said segmental openings and serving as the bearings for the journal-box of the wheel, substantially as specified.

In testimony whereof I have signed my name to this specification in the presence of two subscribing witnesses.

THOMAS N. SUBERS.

Witnesses:
WILLIAM D. CONNER,
HARRY SMITH.